United States Patent
Imms

(10) Patent No.: US 10,636,387 B2
(45) Date of Patent: Apr. 28, 2020

(54) RENDERING OVERSIZED GLYPHS TO A MONOSPACE GRID

(71) Applicant: Microsoft Technology Licensing, LLC, Redmond, WA (US)

(72) Inventor: Daniel John Imms, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/125,458

(22) Filed: Sep. 7, 2018

(65) Prior Publication Data

US 2020/0082792 A1 Mar. 12, 2020

(51) Int. Cl.
*G09G 5/24* (2006.01)
*G09G 5/28* (2006.01)
*G06F 17/22* (2006.01)
*G06F 17/21* (2006.01)
*G06F 17/24* (2006.01)

(52) U.S. Cl.
CPC ........... *G09G 5/243* (2013.01); *G06F 17/214* (2013.01); *G06F 17/2294* (2013.01); *G09G 5/28* (2013.01); *G06F 17/24* (2013.01); *G09G 2340/14* (2013.01)

(58) Field of Classification Search
None
See application file for complete search history.

(56) References Cited

U.S. PATENT DOCUMENTS

| | | | | |
|---|---|---|---|---|
| 2004/0189666 A1* | 9/2004 | Frisken | .............. | G06T 11/001 345/611 |
| 2004/0212620 A1* | 10/2004 | Dowling | .............. | G06K 15/02 345/467 |
| 2007/0188497 A1* | 8/2007 | Dowling | .............. | G06T 11/203 345/469 |

(Continued)

FOREIGN PATENT DOCUMENTS

| | | |
|---|---|---|
| CN | 105528217 A | 4/2016 |
| WO | 2008118282 A1 | 10/2008 |

OTHER PUBLICATIONS

"ECMAScript", retrieved from «http://en.wikipedia.org/wiki/ECMAScript», May 11, 2015, 9 pages.

(Continued)

*Primary Examiner* — Vu Nguyen
(74) *Attorney, Agent, or Firm* — Ogilvie Law Firm

(57) ABSTRACT

Tools and techniques are described to render oversize glyphs in a monospace grid. Glyph rendering algorithms collect changed cells, collect affected cells based on overlap, clear certain affected cells, and redraw only specified cells. By reducing the number of cells whose glyphs are redrawn in response a text edit, algorithms permit faster execution even when rendering is done by a script rather than precompiled code. Algorithmic advances also permit faster display frame rates, and help preserve battery power. Grids may be numbered, and traversed, in different ways. Oversize glyphs may include underscores, ligatures, mathematical symbols, emojis, kanji, accented characters in various natural languages, (Continued)

and wide or tall text characters which extend beyond the display space of a single cell. Glyph rendering may provide user interface updates in browsers, shells, terminal emulators, and other programs.

20 Claims, 7 Drawing Sheets

(56) References Cited

U.S. PATENT DOCUMENTS

| | | | | |
|---|---|---|---|---|
| 2013/0222407 | A1* | 8/2013 | Matskewich | G06T 11/203 345/589 |
| 2014/0184635 | A1* | 7/2014 | Maekawa | G09G 5/28 345/611 |
| 2014/0240322 | A1 | 8/2014 | Brumer et al. | |
| 2017/0322913 | A1 | 11/2017 | Kukreja et al. | |

OTHER PUBLICATIONS

"Clipping (computer graphics)", retrieved from «https://en.wikipedia.org/wiki/Clipping_(computer_graphics)», May 21, 2018, 3 pages.

"New terminal lines rendering cuts off bottom/top of characters like underscore #35901", retrieved from «https://github.com/Microsoft/vscode/issues/35901», Oct. 9, 2017, 10 pages.

"Letter shapes are distorted in integrated terminal (canvas renderer) #35188", retrieved from «https://github.com/Microsoft/vscode/issues/35188#issuecomment-332525972», Sep. 26, 2017, 9 pages.

"JavaScript", retrieved from «https://en.wikipedia.org/wiki/JavaScript», Aug. 8, 2018, 19 pages.

"Terminal emulator", retrieved from «https://en.wikipedia.org/wiki/Terminal_emulator», Jan. 17, 2018, 3 pages.

"How to use hterm from my browser, and is it just as secure as my regular terminal emulator?", retrieved from «https://webapps.stackexchange.com/questions/41781/how-to-use-hterm-from-my-browser-and-is-it-just-as-secure-as-my-regular-termina», Mar. 17, 2013, 3 pages.

"Hterm and Secure Shell", retrieved from «https://chromium.googlesource.com/apps/libapps/+/master/hterm/doc/embed.md», no later than Aug. 8, 2018, 5 pages.

Daniel Imms, "Integrated Terminal Performance Improvements", retrieved from «https://code.visualstudio.com/blogs/2017/10/03/terminal-renderer», Oct. 3, 2017, 5 pages.

"International Search Report and Written Opinion Issued in PCT Application No. PCT/US2019/039647", dated Oct. 11, 2019, 11 Pages.

* cited by examiner

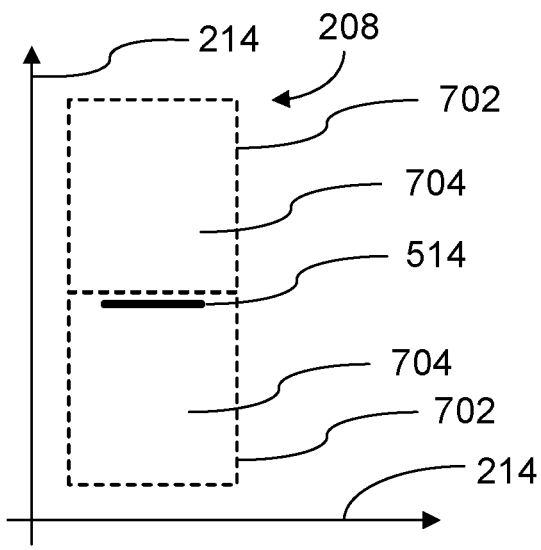
Fig. 7
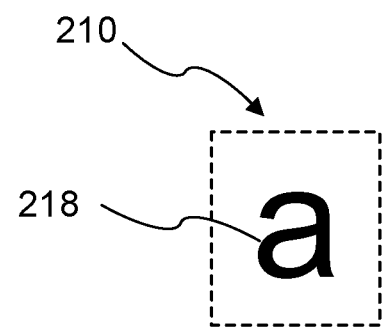
Fig. 8
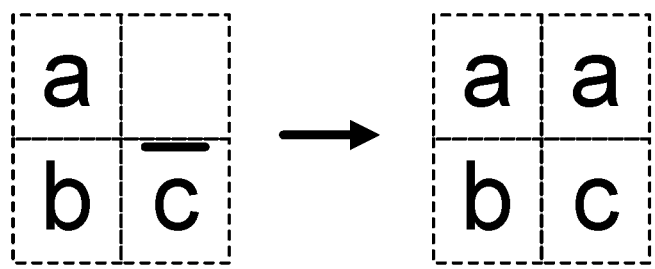
Fig. 9
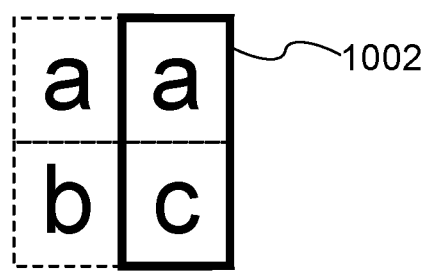
Fig. 10
a a
b c
Fig. 11

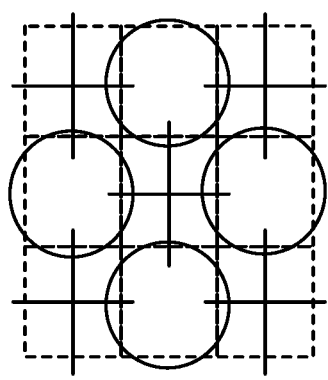  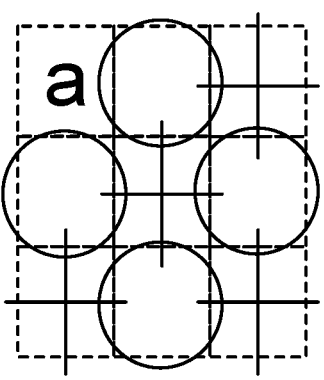    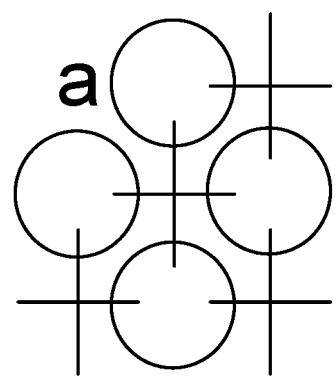
Fig. 16                     Fig. 17
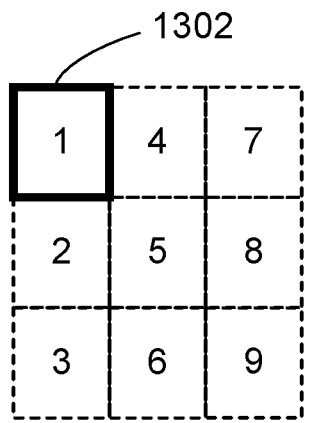  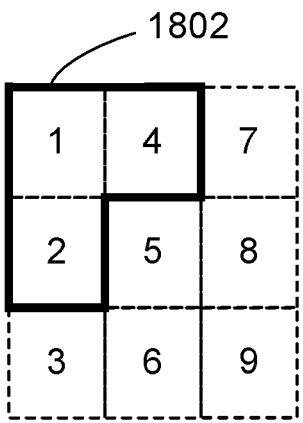  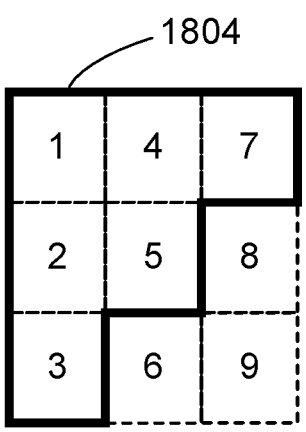
Fig. 18
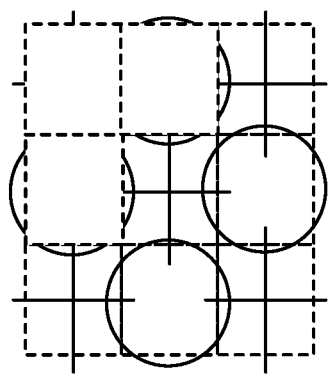    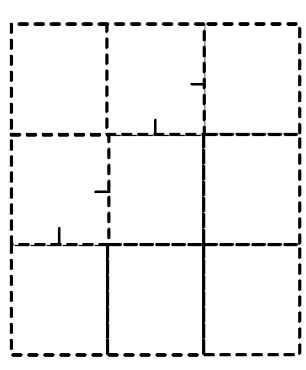    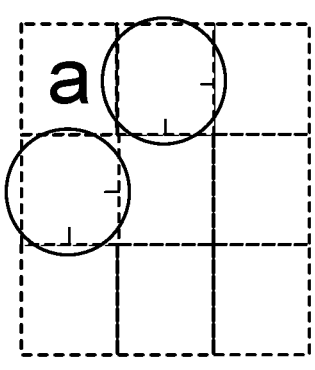
Fig. 19        Fig. 20        Fig. 21

RENDERING OVERSIZED GLYPHS TO A MONOSPACE GRID

BACKGROUND

As used herein, a "glyph" is a member of a set of written symbols. Glyphs include alphanumeric symbols, mathematical symbols, emojis, kanji, hieroglyphs, and other readable symbols. For convenience and suitable scope, the term "glyph" also refers herein to digital or other electronic representations of such written symbols. A "display" is a device, or portion of a device, which can be controlled to show (i.e., to display) glyphs. Some displays of particular interest include the displays in smartphones, tablets, laptops, workstations, and other computing systems. Glyphs are shown on a display by a process known as "rendering", which involves placing an image that represents the glyph at some chosen location in a visible portion of the display, so the glyph can be read. In general, rendering is accomplished by executing rendering logic, which may be implemented in computational constructs. For example, a particular glyph renderer may be a combination of one or more constructs such as precompiled software, interpreted software, firmware, CPUs and other processors, random access memory, read only memory, and special purpose computing hardware.

SUMMARY

Some teachings herein were motivated by an initial technical challenge of improving performance of an interpreted renderer without replacing an interpreted renderer script with precompiled native code. One subordinate challenge was how to speed up rendering, and another subordinate challenge was how to avoid chopping off the right side of a character when rendering the character to its right. One emergent technical challenge was how to properly and efficiently render glyphs that cover more than one cell of a monospace grid, and a related challenge was how to accomplish that in a scripted execution environment. Other technical challenges addressed by the innovations taught here will also be apparent to one of skill from the discussion provided below.

Some glyph rendering embodiments include a processor, a memory in operable communication with the processor, a display in operable communication with the processor, and a glyph renderer. The display is configured to display contents of glyphs in a monospace grid having at least two orthogonal axes and having grid cells. The glyph renderer includes rendering software that is executed by one or more processors to perform at least the following: (a) collect changed cells, namely, grid cells that upon being redrawn will get visible replacement glyph content; (b) collect affected cells, namely, cells that an a changed cell or other affected cell overlaps (in terms of content location); (c) clear the contents of changed and affected cells; and (d) redraw the contents of changed and affected cells in a redraw sequence which complies with a predefined grid traversal order, thereby replacing the contents of affected cells with their respective replacement glyph content, while avoiding redrawing visible cells which are not affected cells. The "content" of a cell refers to the visual representation of a glyph that is assigned to the cell; the content of a cell may extend beyond the display area that is assigned to the cell. Indeed, some embodiments were devised in response to technical challenges that occur when a cell's content escapes from the cell, e.g., how to avoid cutting off or hiding that content when additional glyphs are rendered.

Some embodiments provide or use particular actions for rendering oversized glyphs to a monospace grid. For example, an embodiment may collect changed cells, i.e., grid cells that upon being redrawn will get visible replacement glyph content from their respective original glyph content. The embodiment may also collect a non-empty set of first-level affected cells, i.e., with changed cells plus cells that a changed cell overlaps plus cells that overlap a changed cell. Overlap is with regard to original glyph content or replacement glyph content or both. The embodiment may also collect a set of second-level affected cells, if any, i.e., each cell that is not a first-level affected cell, and that a first-level affected cell overlaps or that overlaps a first-level affected cell. Again, overlap is with regard to original glyph content or replacement glyph content or both. The embodiment may also clear the contents of first-level affected cells. The embodiment may also redraw the contents of affected cells in a redraw sequence which complies with a predefined grid traversal order, thereby replacing the contents of affected cells with their respective replacement glyph content. Along the way, the embodiment may also avoid redrawing visible cells which are not affected cells.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a diagram illustrating two glyph display grid bounding cells, two grid axes, and an underscore glyph that escapes its assigned grid bounding cell;

FIG. 8 is a diagram illustrating a grid bounding cell and a glyph which is assigned to the grid bounding cell and does not escape the grid bounding cell;

FIG. 9 is a diagram illustrating initial and changed states of cells (bounding cells may also be referred to simply as "cells") in a 2-by-2 monospace grid;

FIG. 10 is a diagram illustrating an area to be redrawn as part of a particular rendering process;

FIG. 11 is a diagram illustrating a visual appearance of glyphs as rendered on a display, to help make the point that bounding cells are generally not explicitly shown to a user;

FIG. 12 is a diagram illustrating an initial state of cells containing the glyphs "W", "_", "a", and "b" in a 2-by-2 monospace grid, and also showing a changed state of the grid in which "W" has been replaced by "c";

FIG. 13 is a diagram illustrating stages in the W_ab example;

FIG. 14 is a diagram illustrating one of several possible cell numberings of a 2-by-2 monospace grid;

FIG. 15 is a diagram illustrating another possible cell numbering of the 2-by-2 Monospace grid;

FIGS. 16-21 collectively illustrate glyph rendering and are referred to herein as the "test glyphs example";

FIG. 16 is a diagram illustrating an initial state of cells containing circle glyphs and crossed-segments glyphs in a 3-by-3 monospace grid, and also showing a changed state of the grid in which the top left crossed-segments glyph has been replaced by an "a" glyph;

FIG. 17 is a diagram illustrating a visual appearance of the changed state of the grid shown in FIG. 16, in which the bounding cells are not explicitly shown;

FIG. 18 is a diagram illustrating stages in the test glyphs example;

FIG. 19 is a diagram illustrating an action in the test glyphs example which clears first-level affected cells;

FIG. 20 is a diagram illustrating an action in the test glyphs example which redraws glyphs of second-level affected cells in an area clipped to include only the first-level affected cells;

FIG. 21 is a diagram illustrating an action in the test glyphs example which draws the "a" glyph and redraws the second-level affected cell glyphs, clipped to include only the top left changed cell;

FIG. 22 is a diagram illustrating an initial state of cells containing a ligature glyph "<==" in a 3-by-1 monospace grid with that "<==" glyph assigned to the rightmost cell, and also showing a changed state of the grid in which the "<==" glyph has been replaced by a "<=" ligature glyph;

FIG. 23 is a diagram illustrating stages in the ligature example;

DETAILED DESCRIPTION

Overview

Figure 1:
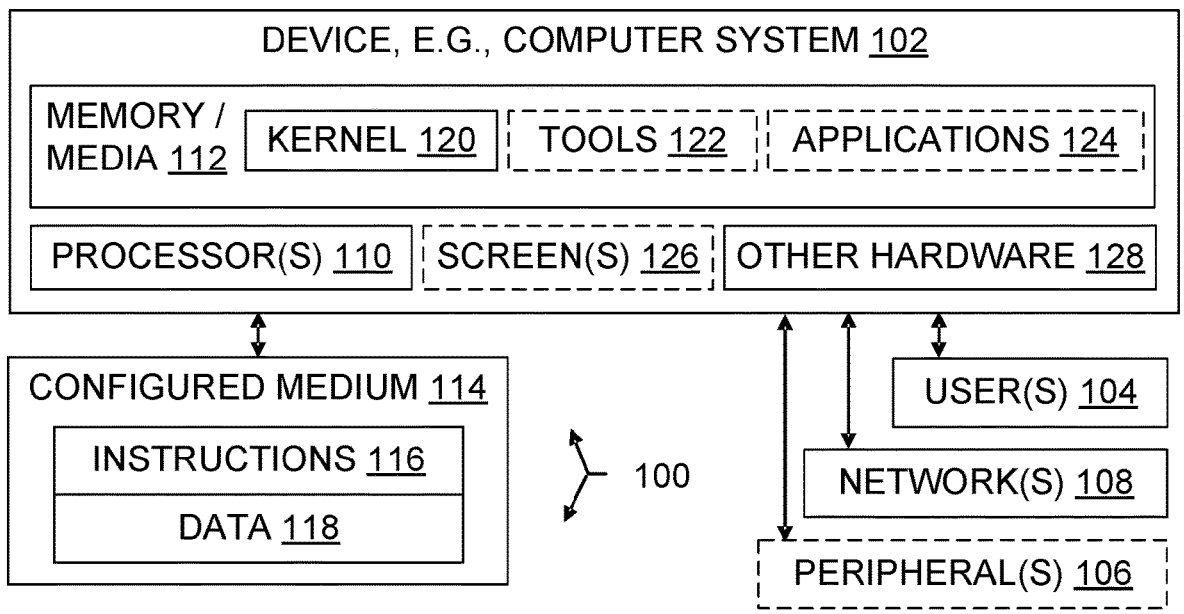
FIG. 1 is a block diagram illustrating a computer system generally and also illustrating a configured storage medium generally.

Innovations may expand beyond their origins, but understanding an innovation's origins can help one more fully appreciate the innovation even when the innovation has grown well beyond its original focus. In the present case, some glyph rendering innovations arose in the context of the inventor seeking ways to improve on a circa October 2017 rendering engine of an Integrated Terminal feature of a Microsoft Visual Studio® Code extensible software development tool (mark of Microsoft Corporation). That 2017 rendering engine was itself a rewrite of earlier rendering code which utilized DOM technology.

Some embodiments described herein remedy or avoid deficiencies of one or more earlier renderers. In the 2017 engine, character bounding cells were completely isolated from one another, so characters did not overlap. This 2017 engine did not properly account for ligatures, and sometimes it cut off part of characters. Depending on the font, it would sometimes cut off the right, top, or bottom side of characters. As a result, characters such as underscore could be erroneously hidden completely. These deficiencies are addressed by teachings presented herein.

Some innovations described herein also led to faster rendering, e.g., by redrawing fewer characters when their cells' contents have not changed. Faster rendering means better battery life, because less power is used for rendering activity that does not change previously rendered visual content. Faster rendering also permits faster frame rates.

Maintenance costs and potential bugs are also reduced from the 2017 engine in some embodiments presented here. This is achieved, e.g., by avoiding use of old code for drawing wide characters such as Chinese hanzi, Japanese kanji, Korean characters, or emojis. These embodiments handle such glyphs as a part of their primary workflow, instead of relegating their render processing to a tangential special purpose workflow.

More generally, rendering an arbitrary monospace font to a monospace grid poses technical challenges because pixels of a glyph may extend beyond the bounds of the grid cells. Glyph pixels can potentially extend in any direction on a display, depending on the font and the particular character corresponding to the glyph.

A goal of rendering may be to render glyphs in ways that provide them with a smooth and natural appearance to human viewers. Changes in content are reflected visually by drawing at least the changed content. This raises the technical question of what additional pixels or other glyph portions should be redrawn. Redrawing an entire display screen would generally be correct, but may be very slow. Unless every visible glyph has changed, redrawing the entire screen would also do some display painting that did not have to be done in order to present the correct appearance to viewers. One alternative is to redraw any line which has new content, but only such lines. Actions redrawing lines and clipping along the top and bottom of glyph cells could have correctness problems, e.g., the underscore glyph "_" being cut off. On the other hand, such redrawing and clipping could lead to performance improvements since only the line with the change is updated, as opposed to the entire screen. However, in some situations neither of these approaches (redraw entire screen, redraw only entire row) is sufficient for drawing correctly and efficiently. In some devices, efficiency is particularly important to improve rendering frames per second, or to conserve the battery life of the device, or both.

Various technical approaches to rendering are described herein, and one of skill will make reference to the entire discussion for full understanding. By way of example, some teachings presented herein measure a character glyph before it is drawn to the screen and record which adjacent cells it impacts. These cells may be considered the glyph's "bounding cells", and the impact information may be stored in a map. When text is being drawn to the screen, a list of changed cells is generated. A pass is done which gathers all characters that have changed, i.e., all cells whose glyphs have been changed but not yet redrawn. For each changed character the bounding cells are also included and considered in the same way, recursively expanding the area to be redrawn to obtain a set of "changed cells". After the changed cells are gathered, their display area can be cleared and then all characters in the changed cells are redrawn. This yields correct text with a reduced (possibly minimal) amount of glyph redraws. This rendering approach can be extended to support ligatures and grapheme clusters by changing the bounding cells of these sets of characters.

Some embodiments described herein may be viewed by some people in a broader context. For instance, concepts such as change, clearing, collecting, drawing, overlap, replacement, and written symbol may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently render monospace text on a grid with varying sized glyphs. Other configured storage media, systems, and methods involving change, clearing, collecting, drawing, overlap, replacement, or written symbols are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Embodiments address technical activities that are rooted in computing technology, such as rendering glyphs to a display screen. Some glyph rendering embodiments improve the functioning of computing systems by automatically reducing the number of glyphs which are redrawn. Reducing rendering operations without sacrificing the correct visual appearance of rendered glyphs makes systems operate more efficiently by conserving battery power and permitting faster frame rates.

Some technical adaptations of some embodiments include a map which correlates cells based on whether glyphs assigned to the cells overlap cell boundaries, and various collections of cells such as changed cells, affected cells, first-level affected cells, second-level affected cells, and grid traversal orders.

Other aspects and advantages of the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.

ALU: arithmetic and logic unit
API: application program interface
ASCII: American standard code for information interchange
BIOS: basic input/output system
CD: compact disc
CPU: central processing unit
DOM: document object model
DVD: digital versatile disk or digital video disc
FPGA: field-programmable gate array
FPU: floating point processing unit
GPU: graphical processing unit
GUI: graphical user interface
IoT: internet of things
IP: internet protocol
LAN: local area network
OS: operating system
RAM: random access memory
ROM: read only memory
UEFI: Unified Extensible Firmware Interface
URI: uniform resource identifier
VM: virtual machine
VS: Visual Studio® program (mark of Microsoft Corp.)
VS Code: Visual Studio® Code program (mark of Microsoft Corp.)
WAN: wide area network Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

One could perhaps distinguish between an initial appearance of a visible pixel and repeated appearances at that same location, e.g., by referring to the first as "drawing" and the latter as "redrawing". However, for current purposes one is not called on to make such a distinction. For simplicity and convenience the terms "drawing" and "redrawing" are used interchangeably herein, to mean placing pixels, line segments, or another visual representation of a glyph, or a portion of a glyph, on a display.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as rendering a glyph by making it appear on a computing device display screen, computing whether a glyph of a cell overlaps neighboring cells, clearing cell content, and executing code, are understood herein as inherently digital. A human mind cannot interface directly with a CPU or other processor, or with RAM or other digital storage, to read and write the necessary data to perform the glyph rendering steps taught herein. This would be well understood by persons of skill in the art in view of the present disclosure, but others may sometimes need to be informed or reminded of the facts. Unless stated otherwise, embodiments are also presumed to be capable of operating at scale (i.e., operating on event data from one hundred or more monitored devices) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accounting for, affecting, changing, clearing, clipping, collecting, correlating, disallowing, displaying, drawing, executing, increasing, interpreting, overlapping, redrawing, traversing, (and accounts for, accounted for, affects, affected, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data

120 kernel(s), e.g., operating system(s), BIOS, UEFI, device drivers

122 tools, e.g., anti-virus software, firewalls, packet sniffer software, intrusion detection systems, intrusion prevention systems, software development tools and tool suites, hardware development tools and tool suites, diagnostics

124 applications, e.g., word processors, web browsers, spreadsheets, games, email tools

126 display screens, also referred to as "displays"

128 computing hardware not otherwise associated with a reference number 106, 108, 110, 112, 114

202 computer system or device enhanced by at least a glyph renderer

204 glyph renderer

206 display region, e.g., window a browser, area showing command line prompt(s) and commands entered (if any) and command execution results (if) in a terminal emulation program, or another portion of a text-based interface or graphical user interface

208 grid of bounding cells for positioning glyphs when rendering to a display; grid is used internally and is typically not displayed per se to users

210 bounding cells for positioning glyphs when rendering to a display; cell edges are used internally and are typically not displayed per se to users

212 row of bounding cells for positioning glyphs when rendering to a display

214 axes of grid 208, e.g., a horizontal axis and a vertical axis; axes are used internally or in documentation, and are typically not displayed per se to users

216 glyphs, namely, a data structure having a value (e.g., a Unicode® value or an ASCII value) and also having a visual representation (e.g., pixels, bitmap, ray tracing) (mark of The Unicode Consortium); glyphs represent written symbols; examples of glyphs are noted throughout this document, and the term "glyph" should be understood broadly to include any and all of them, including at least each of the following and any combination thereof employed as a unit: alphanumeric symbols, mathematical symbols, emojis, hanzi, kanji, hieroglyphs, text characters (regular or wide), emoticons, graphemes, ligatures, underscores, accented characters, and any text character or written symbol represented in a commercially available font compatible with any of the following software tools at the time of earliest filing of the present document or a priority document of the present document with any authority authorized at that time to receive patent applications: Adobe® Acrobat® (marks of Adobe Systems Inc.), Google® Docs (mark of Google, Inc.), Mathematica® (mark of Wolfram Research, Inc.), or Microsoft® Word™ (marks of Microsoft Corporation)

218 visible contents of a glyph

220 overlap between visible content of a glyph that resides primarily in or is otherwise assigned to a cell C and screen area within the bounds of one or more other cells

222 map correlating a cell C with zero or more neighboring cells in a grid, based on which neighboring cells (if any) the glyph assigned to cell C overlaps

224 glyph renderer controller, e.g., a program which includes or controls a glyph renderer

302 web browser
304 command shell
306 web application
308 terminal emulator

Figure 3:
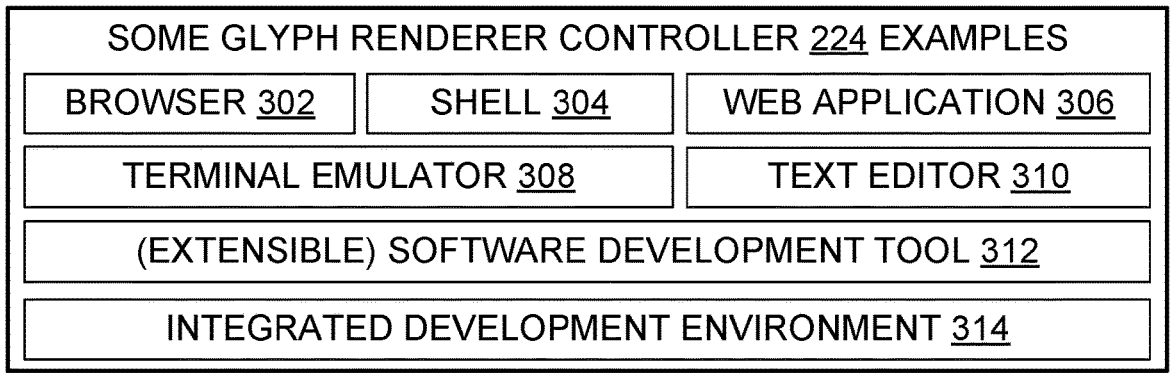
FIG. 3 is a block diagram illustrating examples of glyph renderer controllers.

310 text editor
312 software development tool; may be extensible
314 integrated development environment; note that some programs fit more than one of the FIG. 3 examples, e.g., a text editor may operate as a software development tool within an integrated development environment, and a command shell may run inside a web browser window

402 glyph value, e.g., single-byte ASCII value or double-byte Unicode value

Figure 22:
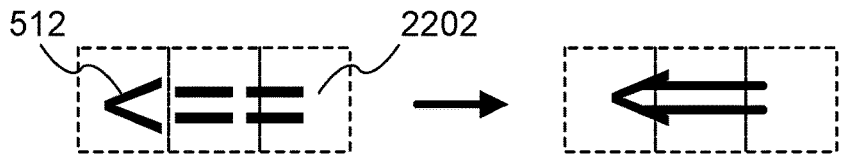
FIGS. 22-23 collectively illustrate glyph rendering and are referred to herein as the "ligature example"
Figure 23:
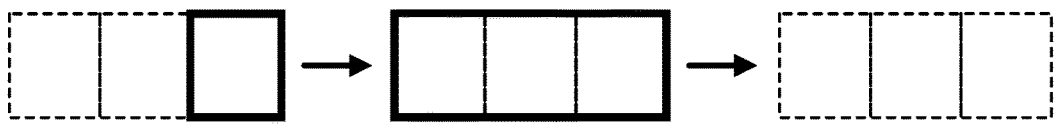

404 glyph extent; in many cases this will be a single cell, but in the case of ligatures or glyphs whose graphical content extends beyond a single cell the extent identifies multiple cells; cells may be identified relative to an anchor cell, e.g., the ligature "<==" illustrated in FIGS. 22 and 23 is anchored in the rightmost cell but extends two cells to the left of that anchor cell

502 text characters, namely, any character used in writing text in any natural language or any programming language

504 mathematical symbol
506 emoji
508 emoticon
510 grapheme, namely, the smallest meaningful contrastive unit in a writing system
512 typographic ligature, e.g., two or more graphemes combined into a unitary glyph
514 underscore character in any font; underscore is represented in the current font of this document as "_"
516 kanji or hanzi glyph, e.g., 幸, せ, 休, 日, 亚, 太, 公, 司 and so on; Japanese hiragana and katakana are some examples of text characters 502
518 accented characters; "accented" is used broadly herein to include circonflex, accent grave, accent aigu, umlaut, and other visible additions to or modifications of alphabetic characters; some examples of accented characters include, e.g., "é", "ö", "û", "ã", "ø", "ë", "Ä", "è", "å", "ę", "Ö", "Ł", and "ū"
520 test characters, e.g., characters designed to test or illustrate glyph rendering; test characters do not necessarily belong to the written form of any natural language or programming language and are not necessarily widely recognized as mathematical symbols; examples include the circle and crossed-segments test glyphs shown in FIGS. 16 and 17
600 grid cell categories; a grid cell may belong to more than one category at a given time, e.g., a cell may be both changed and visible; a grid cell may belong to different categories at different times, e.g., a cell may be cleared and then redrawn
602 changed cell
604 affected cell
606 first-level affected cell
608 second-level affected cell
610 visible cell (meaning visible within the display, regardless of whether a glyph is visible in the cell); in some embodiments, a visible cell may contain only whitespace but nonetheless be visible, in that a cell is visible when part or all of the cell is within a visible display area, regardless of the cell's particular content
612 cell which is not in view, i.e., not visible within the display
614 empty cell, e.g., a cell which either has no currently assigned glyph or whose assigned glyph is whitespace
616 non-empty cell, e.g., a cell which has a currently assigned glyph that is not entirely whitespace 618 redrawn cell, e.g., a cell whose currently assigned glyph has been redrawn since the point in time when the glyph was assigned to the cell
620 cleared cell, e.g., a cell whose currently assigned glyph has been erased since the point in time when the glyph was assigned to the cell
702 grid cell border; may also be referred to as cell boundary or edge
704 grid cell interior; may also be referred to as the cell's display area
1002 area to be redrawn
1302 changed cell(s)
1304 affected cell(s)
1306 redrawn area
1802 changed cell(s) plus first-level affected cell(s)
1804 first-level affected cell(s) plus second-level affected cell(s)
2202 ligature anchor cell
2400 flowchart; may also refer to method (algorithm) documented by flowchart; may also refer to rendering one or more glyphs using such a method
2402 collect one or more changed cells
2404 collect one or more affected cells; this may refer to both changed and affected-but-not-changed cells, depending on context
2406 collect one or more first-level affected cells
2408 collect zero or more second-level affected cells
2410 clear contents of one or more cells
2412 redraw one or more cells
2414 avoid redrawing one or more cells
2500 flowchart; may also refer to a method documented by flowchart, or to rendering using such a method
2502 execute code
2504 avoid redrawing one or more visible but not-affected and not-changed cells
2506 traverse a grid of cells and perform an operation on cells along the way, e.g., to clear the cells or redraw the glyphs of the cells
2508 order in which a traversal 2506 occurs
2510 traversal order 2508 in which a grid is traversed one row at a time with cells in a given row being traversed from left to right; this order correspond to the order in which English, French, German, Spanish and similarly reading-ordered documents are normally read
2512 display the contents 218 assigned to a cell
2514 portion of a display 126
2516 control a glyph renderer, e.g., send text to the renderer, send the renderer a command to display text, or make the renderer available to a user
2518 execute code by interpreting a script, as opposed to executing precompiled code
2520 interpret a script
2522 correlate cell overlaps, e.g., make or update a map data structure which indicates whether a cell's glyph overlaps other cells and if so, which other cells
2524 affect another cell, e.g., by having a glyph that overlaps the other cell's interior
2526 be affected by another cell, e.g., by having your interior overlapped by the glyph of the other cell
2528 account for a ligature during glyph rendering, e.g., by computing overlap, skipping cells that are grouped by the ligature with a cell already processed
2530 increase cell size
2532 clip redrawing to a specified area
2534 clear only a portion of a cell's interior
2536 portion (less than entirety) of a cell's interior
2538 disallow drawing between cell rows during rendering
2540 avoid redrawing a portion of a row of cell glyphs
2542 assess glyph overlap, e.g., by identifying cells which a rendered glyph's contents will overlap; as a convenient shorthand, one may refer to "cell overlap" when discussing one cell's assigned glyph's content overlapping another cell's display area
2544 assign glyph to cell, e.g., by assigning the glyph's value to an array element or other variable which helps implement the cell
2546 anchor a ligature glyph at a cell, e.g., by assigning the ligature glyph's value to an array element or other variable which helps implement the cell
2548 mitigate cell escapes by glyphs of a font, that is, perform processing to compensate for a cell's assigned glyph's contents extending outside the cell's display area
2602 software code which implements a glyph renderer, documents a glyph renderer, or does both
2604 precompiled code (as opposed to interpreted code), sometimes referred to as "native" code
2606 interpreted code (as opposed to precompiled code, but code 2606 may include just-in-time compiled code); sometimes referred to as a "script"
2608 pseudocode; unlike executable precompiled code 2604 and executable interpreted code 2606, pseudocode is not executable and is used as documentation of a glyph renderer, not as part of an implementation of the glyph renderer Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, engineers, and end-users are each a particular type of user 104. Automated agents, scripts, playback software, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 314 which provides a developer with a set of coordinated computing technology development tools such as compilers, source code editors, profilers, debuggers, layout tools, simulators, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programs, programming models, development tools, and development methodologies.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, data structures, or functionalities for instance, and may otherwise depart from the examples provided herein.

Figure 2:
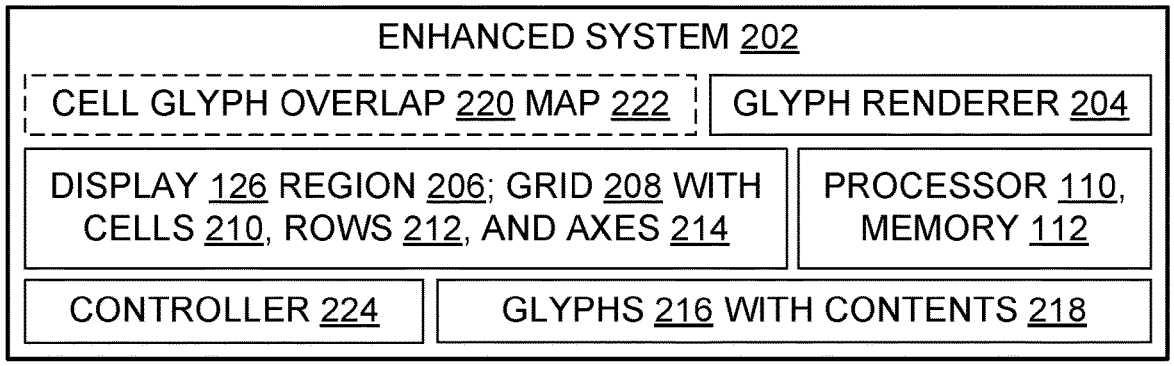
FIG. 2 is a block diagram illustrating aspects of an enhanced computing system which includes a glyph renderer and other items.
Figure 26:
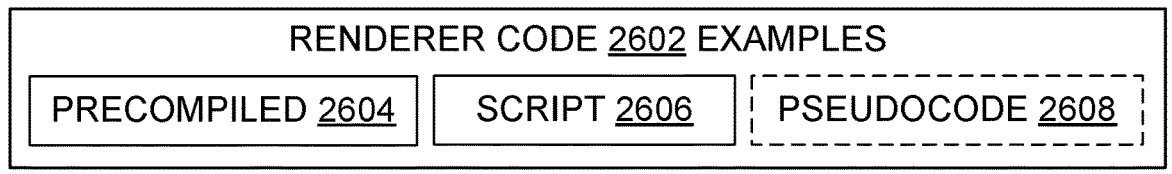
FIG. 26 is a block diagram illustrating examples of kinds of code which may be used to implement or explain (or both) a glyph renderer's operation or structure (or both).

FIGS. 2-6, 26, and others illustrate aspects of some architectures that are suitable for embodiments taught herein. As shown in FIG. 2, an enhanced system 202 is a system 102 which includes a glyph renderer 204. The glyph renderer 204 renders graphical contents 218 of glyphs 216 on a screen 126. In some embodiments, rendering includes both drawing the contents 218 on the screen and the underlying computations which determine what glyph content to draw at what screen location, and obtain that content from memory 112. Drawing is also sometimes called "painting". As shown in FIG. 26, renderers 204 may be implemented with precompiled code 2604, with interpreted code 2606, or both. Both precompiled code 2604 and interpreted code 2606 are considered "executable" code herein, and both may be considered a form of renderer documentation (recognizing that only interpreted code 2606 is human-legible). Pseudocode 2608 is another kind of code, which may help document a renderer 204 but is not executable by a processor, although it may be translated into executable code. Some pseudocode 2608 is recited elsewhere in the present disclosure.

It is expected that the glyph renderer 204 will often be part of, commanded by, or otherwise under the control of software 224 which has functionality beyond drawing glyphs. As shown in FIG. 3, some examples of such controller software 224 include browsers 302, command shells 304, web-based applications 306, terminal emulators 308, text editors 310, software development tools 312 (e.g., compilers, debuggers, profilers, code editors), and tool suites or collections such as integrated development environments 314.

Figure 4:
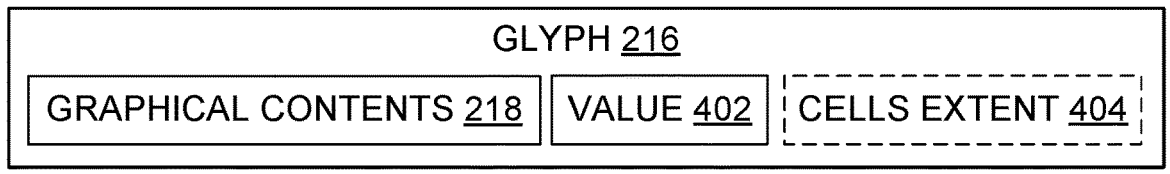
FIG. 4 is a block diagram illustrating aspects of a glyph data structure.
Figure 5:
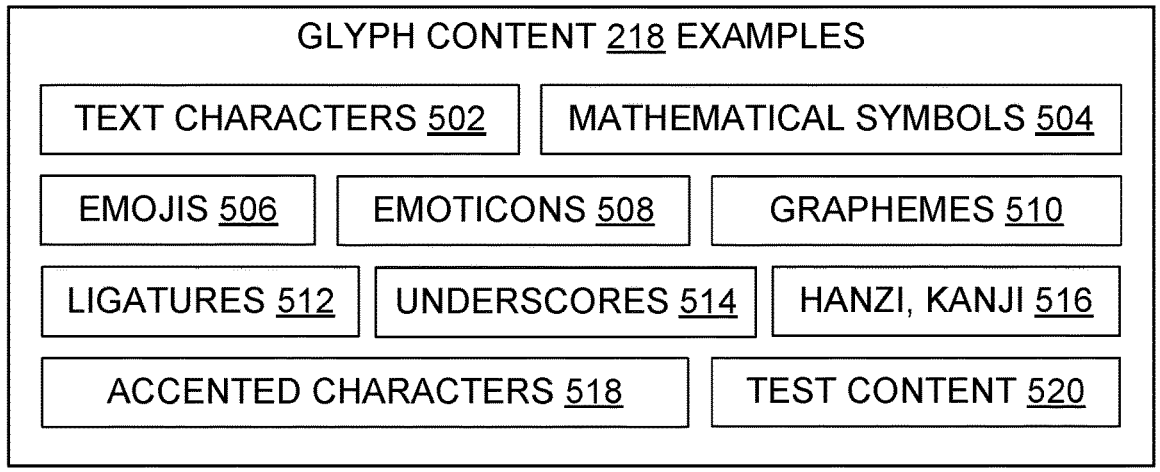
FIG. 5 is a block diagram illustrating examples of glyph content.

As shown in FIG. 4, the glyphs 216 may be implemented as data structures which each have a value 402 and graphical content 218. The value may be e.g., a Unicode® or ASCII value. The graphical content 218 may include segment coordinates, bitmaps, pixel values, alpha channel (transparency) information, segment or vector endpoint coordinates, or other data which controls the glyph's visual appearance. FIG. 5 lists several examples of glyph contents 218. Some glyphs 216 may include extent 404 data, which indicates the extent of the drawn content, in terms of neighbor cell counts and locations, for example, or as multipliers of a cell unit (e.g., to indicate that a glyph is three cells wide and one cell high). Extent data 404 may also indicate an anchor 2202 point for a glyph, e.g., that the glyph extends two additional cells to the left from an anchor point in the display area of a cell. Default values may be used, e.g., glyphs may default to one cell wide and one cell high unless otherwise indicated.

Figure 6:
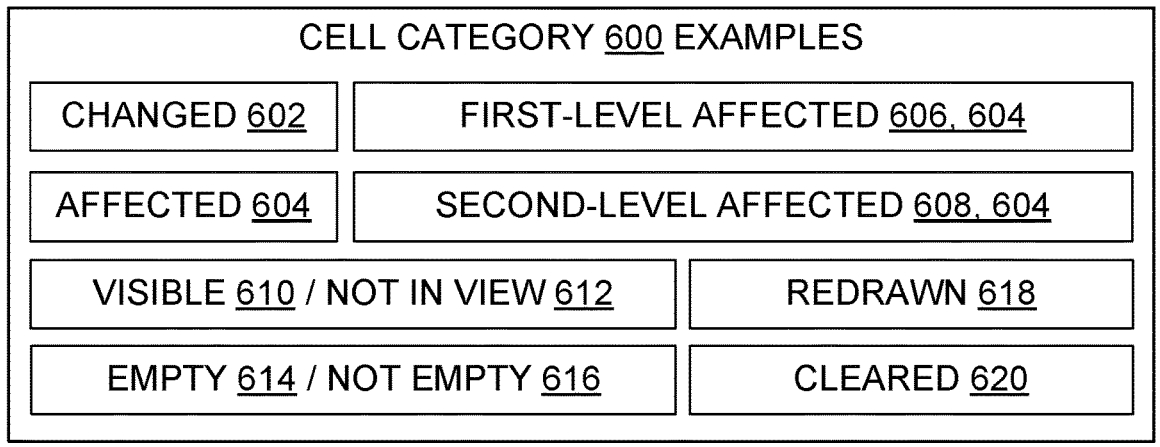
FIG. 6 is a block diagram illustrating examples of categories to which a glyph display grid bounding cell may belong.

During the rendering of glyphs 216, a visible portion 206 of the screen 126 is organized as a grid 208 of cells 210. Glyphs 216 get assigned to one or more respective cells; every glyph being drawn has at least one assigned cell. FIG. 6 illustrates some categories 600 that a given cell may belong to during rendering. These categories 600 are illustrated in FIGS. 7-23, and they are discussed in detail elsewhere herein as they arise during discussion of the operation of various glyph renderer 204 embodiments.

Some of the various embodiments described herein use or provide a computing system 202 which is configured for rendering oversized glyphs 216 and possibly other glyphs 216 to a monospace grid 208. Glyphs are deemed "oversized" when their graphical content 218 extends (or will extend when drawn) beyond a single cell 210. In this example, the computing system 202 includes a processor 110, a memory 112 in operable communication with the processor, a display 126, and a glyph renderer 204. The display is in operable communication with the processor, and the display is configured to display contents 218 of glyphs in a monospace grid 208 having at least two orthogonal axes 214 and having grid cells 210. The cells 210 themselves are used internally, and need not be made expressly visible by rendering glyphs. "Monospace" means each cell 210 has the same size and each other cell, unless and until cell size is expressly changed by rendering.

In this example, the glyph renderer 204 includes rendering software 2604, 2606 (or both) which upon execution by the processor 110 performs at least the following: (a) collects changed cells 602, namely, grid cells 210 that upon being redrawn will get visible replacement glyph content 218; (b) collects affected cells 604, namely, to changed cells add cells that a changed cell or an affected cell overlaps; (c) clears the contents that lie within changed or affected cells; and (d) redraws the contents of changed or affected cells in a redraw sequence which complies with a predefined grid traversal order 2508, thereby replacing the contents of affected cells with their respective replacement glyph content, while avoiding redrawing visible cells 610 which are not affected cells. This is one description of glyph renderer 204 operation; other descriptions are also given herein, in various forms including prose text, pseudocode, and illustrated examples using both text and Figures.

In some embodiments, the predefined grid traversal order 2508 traverses at least a portion of a row R1 from left to right and then traverses at least a portion of a row R2 from left to right, where R1 is above R2, from a perspective looking at the display. This particular traversal order 2508, 2510 may be labeled left-to-right-within-top-to-bottom, and matches the cell numbering shown in FIG. 15, for example. It also matches the reading order normally used in documents written in English, French, German, Spanish, and a number of other natural languages. A different traversal order 2508 may be labeled top-to-bottom-within-left-to-right, and matches the cell numbering shown in FIG. 14, for example. One of skill will acknowledge that many other traversal orders are also possible. Mathematically, a grid with N cells can be numbered in N! (N factorial) different ways.

In some embodiments, the glyph content 218 includes at least one of the following: text characters 502, mathematical symbols 504, emojis 506, emoticons 508, graphemes 510, ligatures 512, underscores 514, or accented characters 518. More generally, a given embodiment may operate on or include glyph content 218 that matches any one or more of the examples shown in FIG. 5 or otherwise taught herein.

In some embodiments, the glyph renderer 204 resides in, includes, or is in operable communication with, a controller 224. The redrawn contents 218 of affected cells 604 are displayed within a portion 206 of the display 126 that is controlled at least in part by the controller 224. In this particular example, the controller includes a browser 302, or a web application 306, or both. In some embodiments, the controller includes at least one of the following: a shell 304, a terminal emulator 308, a text editor 310, an extensible software development tool 312, or an integrated development environment 314. More generally, a given embodiment may communicate with or include a controller 224 that matches any one or more of the examples shown in FIG. 3 or otherwise taught herein.

In some embodiments, the glyph renderer 204 is invoked by, includes, or is in operable communication with, a script

2606. As a result, the redrawn contents 218 of affected cells are displayed within a portion of the display 126 that is controlled at least in part by execution of the script. As a particular example, in some embodiments, the glyph renderer 204 is implemented at least partially in JavaScript® code, and in some, the glyph renderer 204 is implemented substantially or entirely in JavaScript® code.

As used herein, being implemented "substantially" in interpreted code means that at least 80% of the bytes executed to perform glyph rendering are either interpreted code (as opposed to precompiled code) or kernel code 120 that was invoked directly or indirectly from interpreted code. In some embodiments, the glyph renderer is substantially free of precompiled native code. That is, less than 20% of the bytes executed to perform glyph rendering are non-kernel precompiled native code, as opposed to interpreted code.

More generally, in some embodiments the glyph renderer 204 is implemented substantially or entirely in ECMAScript code, that is, in one or more ECMAScript scripting languages. Those of skill will acknowledge that JavaScript®, JScript®, and ActionScript® languages are examples of ECMAScript scripting languages (JavaScript® is a mark of Oracle America, Inc., JScript® is a mark of Microsoft Corporation, and ActionScript® is a mark of Adobe Systems, Inc.). However, ECMAScript scripting languages are not limited to these particular examples. To the extent one must rely on industry standards to define ECMAScript scripting languages, the standards relied on may be those in force at the time of the present document's filing priority date.

Some embodiments include a map 222 which correlates each cell C of a set of cells with zero or more other cells that C affects or that C is affected by. These maps may be used to identify cells that C's content overlaps or that have content which overlaps C.

Other system embodiments are also described herein, either directly or derivable as system versions of described methods or configured media.

Methods

Figure 24:
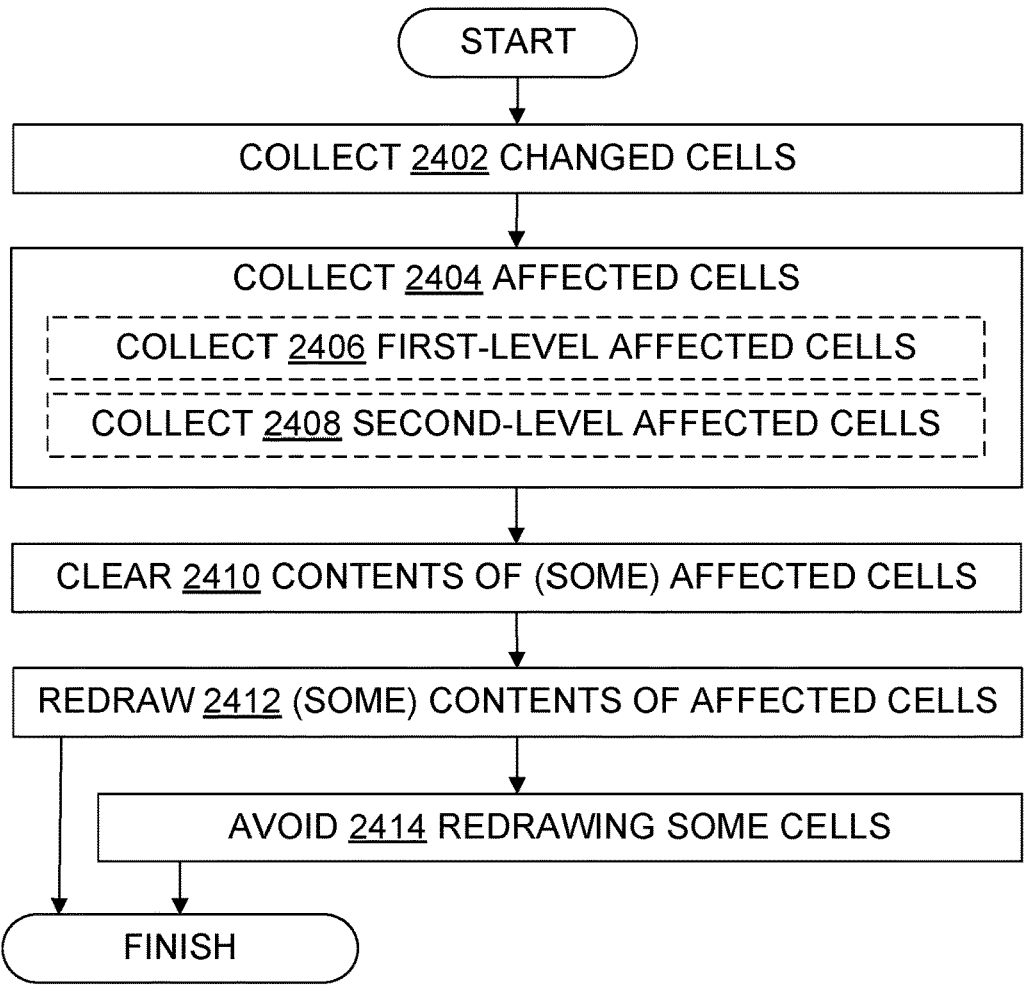
FIG. 24 is a flowchart illustrating steps in some glyph rendering methods.

FIG. 24 illustrates example methods 2400 for glyph rendering. An entity performing a particular method according to flowchart 2400 collects 2402 changed cells, collects 2404 affected cells, clears 2410 affected cell contents, and redraws 2412 affected cell contents. Variations may occur among different particular methods. One variation is whether or not affected cell collection 2404 makes a distinctions between collecting 2406 first-level affected cells and collecting 2408 second-level affected cells. Some methods make the first-level versus second level affected cell distinction, while other methods do not. Another variation is whether contents of all affected cells are cleared 2410 versus whether only some affected cells are cleared 2410. Another variation is whether all contents of affected cells are redrawn 2412 versus whether only some contents are redrawn 2412.

These method variations are among the variations illustrated in the particular examples presented herein. Examples are given to illustrate possibilities, with the understanding that embodiments are not limited to the particular examples provided. Embodiments are not limited, for instance, to a 2-by-2 grid or a 3-by-3 grid used in a particular example. Likewise, embodiments are not limited to the particular glyphs used in the examples, and are not limited to the particular patterns of overlap 220 shown or discussed herein. Ligatures 512 are not limited to three-cell ligatures per the example in FIGS. 22 and 23, and similarly not limited to ligatures that lie entirely within a single row 212 of cells per that example. Patent drawings herein are entirely black-and-white, per Patent Office requirements, but embodiments may employ colored glyph contents 218.

Figure 25:
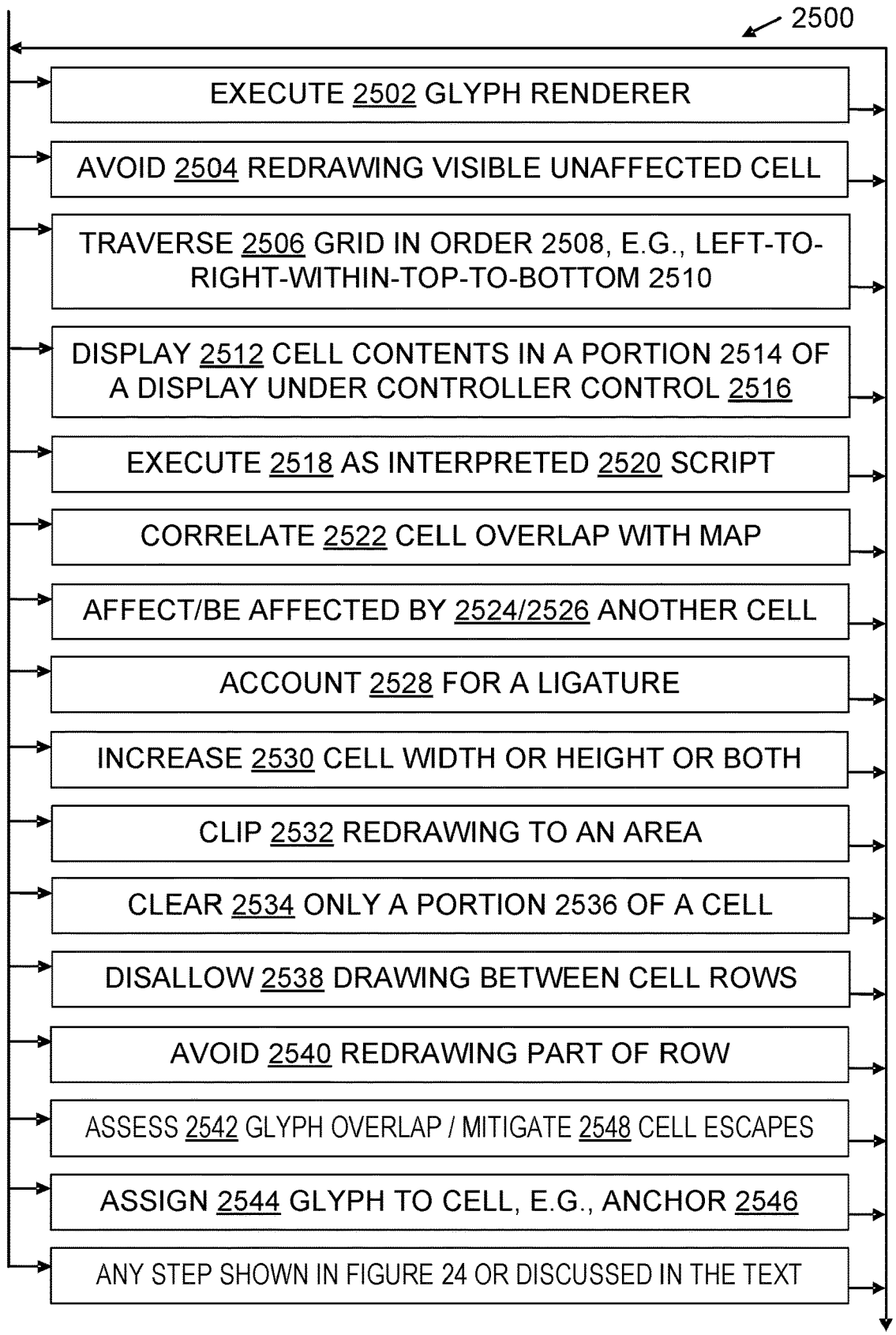
FIG. 25 is a flowchart further illustrating steps in some glyph rendering methods.

Technical methods shown in the Figures or otherwise disclosed will be performed automatically, e.g., by a glyph renderer 204, unless otherwise indicated. Methods may also be performed in part automatically and in part manually to the extent action by a human administrator or other human person is implicated, e.g., manual human input to a controller 224 may result in glyphs being rendered 2400. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 24 and 25. Some steps may be performed serially, may be performed concurrently in a partially overlapping manner, or may be performed fully in parallel, except where a result of one step is functionally required as input to another step. In particular, the order in which flowchart 2500 items are traversed to indicate the steps performed during a method may vary from one performance of the method to another performance of the method. The flowchart 2500 traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

Some embodiments use or provide a method for rendering oversized glyphs to a monospace grid. This method includes collecting 2402 changed cells, namely, grid cells 210 that upon being redrawn 2412 will get visible replacement glyph content 218 differing from their respective original glyph content. This method also includes collecting 2404, 2406 a non-empty set of first-level affected cells 606, 604, namely, by adding to the changed cells any other cells that a changed cell overlaps plus any cells that overlap a changed cell. Cell overlap 220 is assessed 2542 with regard to original glyph content or replacement glyph content or both. This method also includes collecting 2404, 2408 a set of second-level affected cells 608, 604, if any, namely, each cell that is not a first-level affected cell, and that a first-level affected cell overlaps or that overlaps a first-level affected cell. In some embodiments, the set of collected second-level affected cells is empty, and redrawing 2412 only redraws the contents of first-level affected cells. Overlap is again assessed with regard to original glyph content or replacement glyph content or both contents.

This method also includes clearing 2410 the contents of first-level affected cells, without clearing the contents of second-level affected cells. That is, the display area 704 of the first-level affected cells is changed to whitespace or to whatever background color is visible when no glyph content has been drawn in that display area. This method also includes redrawing 2412 the contents 218 of affected cells in a redraw sequence which complies with a predefined grid traversal order, thereby replacing the contents of affected cells with their respective replacement glyph content. This method also avoids redrawing 2412 visible cells which are not affected cells, which improves computational efficiency by avoiding processing that would not have changed a viewer's perception of what the displayed glyphs mean. In some embodiments, the method avoids 2414 redrawing any visible cell which is not an affected cell. Some embodiments avoid 2540, 2414 redrawing at least part of a row of visible cells when at least one cell of the row is not a changed cell. In this case, changing one glyph value of a cell in a row of cells does not require redrawing the entire row of glyphs.

In some embodiments, the method accounts 2528 for a ligature. This accounting may include recognizing that a ligature glyph 512 is assigned 2544 to (e.g., anchored 2546 on) an affected cell. This accounting may also include skipping cells that are covered by the ligature's content when traversing a grid to identify glyph values 402. Other aspects of ligature processing are presented in an example illustrated by FIGS. 22 and 23.

In some embodiments, the method includes mitigating 2548 cell escapes by glyphs of a font, by performing at least one of the following: increasing 2530 cell height, increasing 2530 cell width, clipping 2532 redrawing to occur only within first-level affected cells, clearing 2534, 2410 only a portion of a cell whose own assigned glyph's contents consist of whitespace, or disallowing 2538 drawing between rows of cells.

As noted elsewhere, steps of the method may partially overlap in execution when results of one step are available to another step as needed. But in some embodiments, the glyph renderer upon execution performs the following listed steps in the listed order and without any of the listed steps being concurrent with any other of the listed steps: (a) collecting 2404 changed cells, (b) collecting 2406 a non-empty set of first-level affected cells, (c) collecting 2408 a set of second-level affected cells, if any, (d) clearing 2410 the contents of first-level affected cells, and (e) redrawing 2412 the contents of affected cells without redrawing cells which are not affected cells. In some embodiments, the glyph renderer upon execution performs the following listed steps in the listed order and without any of the listed steps being concurrent with any other of the listed steps: (a) collecting 2404 changed cells, (b) collecting 2404 a non-empty set of affected cells, (c) clearing 2410 the contents of affected cells, and (d) redrawing 2412 the contents of affected cells without redrawing cells which are not affected cells.

In some embodiments, the method includes interpreting 2520 a script which controls the collecting step(s), the clearing step, and the redrawing step. That is, the glyph renderer, the controller, or both may be substantially or entirely implemented in interpreted code, as opposed to precompiled non-kernel native code.

Other method embodiments are also described herein, either directly or derivable as method versions of described systems or configured media.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a glyph renderer 204, overlap map 222, grid traversal order 2508, oversize glyph rendering method 2400, and grid cell categories 600, in the form of data 118 and instructions 116, read from a removable storage medium 114 and/or another source such as a network connection, to form a configured storage medium. The configured storage medium 112 is capable of causing a computer system to perform technical process steps for glyph rendering as disclosed herein. The Figures thus help illustrate configured storage media embodiments and process embodiments, as well as system and process embodiments. In particular, any of the process steps illustrated in FIG. 24 or 25, or otherwise taught herein, may be used to help configure a storage medium to form a configured storage medium embodiment.

Some embodiments use or provide a storage medium 112, 114 configured with code which upon execution by one or more processors performs a method for rendering oversized glyphs to a monospace grid. This method includes collecting 2402 changed cells, namely, grid cells that upon being redrawn will get visible replacement glyph content from their respective original glyph content. This method also includes collecting 2404 a non-empty set of affected cells, namely, changed cells plus cells that a changed cell overlaps plus cells that overlap a changed cell, where overlap is with regard to original glyph content or replacement glyph content or both. This method also includes clearing 2410 the contents of the affected cells, and redrawing 2412 the contents of the affected cells in a redraw sequence 2508. The redraw sequence matches or otherwise complies with a predefined grid traversal order 2508. The redrawing 2412 replaces the contents of affected cells with their respective replacement glyph content. This method also includes avoiding 2540 redrawing an entire row of visible cells by avoiding redrawing at least one cell of the row which is not a changed cell. In some embodiments, redrawing 2412 the contents includes redrawing at least a portion of at least one of the following: a text character, kanji, hanzi, a mathematical symbol, a grapheme, a ligature, an underscore, or an accented character. More generally, redrawing 2412 may include drawing any or all of the graphical content 218 of any one or more glyphs 216.

In some embodiments, the method includes mitigating 2548 cell escapes by glyphs of a font, by performing at least one of the following: increasing 2530 cell height for at least one row of cells, increasing 2530 cell width, clearing 2534 only a portion 2536 of a cell whose own contents consist of whitespace, or disallowing 2538 drawing between rows of cells. In some embodiments, a cell containing only whitespace is considered empty and deemed to not affect any neighboring cell. In some embodiments, the method includes avoiding 2414 redrawing any visible cell which is not an affected cell.

In some embodiments, mitigations 2548 for misbehaving fonts may be performed if characters of a font overlap many cells, e.g., when a recursive evaluation of affected cells would cover the entire viewport 206. If such a situation arises various mitigations can be done. One mitigation is to increase line height or letter spacing (cell size). Another mitigation is to clip any drawing that expands too far; only the affected cells that are directly impacted by changed cells (first-level) are redrawn in their entirety, if these cells are clipped then one expands affected cells only to the second-level. Another mitigation leverages the fact that whitespace is empty to minimize draws; even if a whitespace cell may be affected by several cells, chances are good there won't be many collisions as the whitespace cell does not draw anything itself. In this case one could clear only the right half of the whitespace cell and leave the left half as is, for example. Another mitigation is to fallback to a more primitive algorithm that disallows drawing between rows.

Other configured storage media embodiments are also described herein, either directly or derivable as configured media versions of described systems or method.

Additional Examples and Observations

Some Observations on Figure Interpretation

One of skill will recognize that not every part of this disclosure, or any particular details therein, are necessarily required to satisfy legal criteria such as enablement, written description, or best mode. Also, embodiments are not limited to the particular programming languages, tool contexts, identifiers, fields, class definitions, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide or facilitate efficient rendering of monospace text on a grid with varying sized glyphs. FIGS. 7-23 illustrate aspects of glyph rendering, using subsets of a monospace grid and varying sized glyphs. Some glyph content may reside entirely within the bounds of the assigned cell's display area, as illustrated in FIG. 8. But other glyphs do not fit inside their respective assigned cells. One of the challenges posed by such oversized glyphs is illustrated in FIG. 7, where an underscore glyph assigned to the upper cell shown has content 514 that extends outside the assigned top cell into the display area of the lower cell. In some systems 102, such underscore graphical content 514, 218 may be clipped, or completely obscured, or even not be drawn at all, depending on how the underscore glyph is rendered, resulting in a display of glyph contents 218 that does not accurately visually match the underlying sequence of glyph values 402. Some embodiments taught herein avoid this erroneous result.

FIG. 9 illustrates a grid state change. An initial grid state is shown on the left, a modified grid state is shown on the right, and an arrow is shown to indicate the change in state. The initial state may also be referred to as the old state, the original state, the unmodified state, the starting state, and so on, while the modified state may also be referred to as the new state, the final state, the finished state, the changed state, and so on.

In FIG. 9, as in FIGS. 12, 16, 18, 22, and 23, the state transition arrow is shown for purposes of discussion only; the arrow would not typically appear on a display. The same is true of callout lines, reference numerals, Figure captions, and cell grouping indicators shown by thickened lines in FIGS. 10, 13, 18, and 23. Each of these visual items in the Figures is for discussion purposes, and not meant to depict part of an actual rendered display 126. Similarly, in FIG. 9 and several other Figures, the boundaries 702 of the grid cell display areas are shown as dashed lines, because the cell boundaries are shown in the Figures to aid discussion of the technology but normally do not appear on the display. Cell bounds 702 may be inferred by a viewer from a rendered display, such as the one illustrated in FIG. 11, but bounds 702 are typically not actually visible on the display. Similarly, axes 214 are shown in the Figures to illustrate aspects of the grid 208, and may be inferred by a viewer 104, but grid axes 214 are typically not actually visible on the display 126.

FIG. 10 illustrates an area 1002 to be redrawn. Based on the grid state change shown in FIG. 9, the changed cell 602 would be the upper right cell which changes from "_" to "a". The affected cells in this example include that changed cell, plus the cell below it, which was overlapped by the "_".

A W_ab Example

Figure 12:
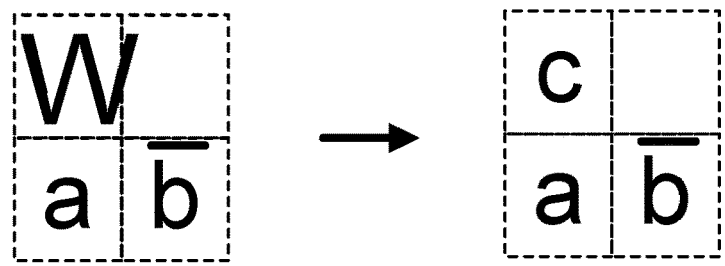
FIGS. 12-15 collectively illustrate glyph rendering and are referred to herein as the "W_ab example"
Figure 13:
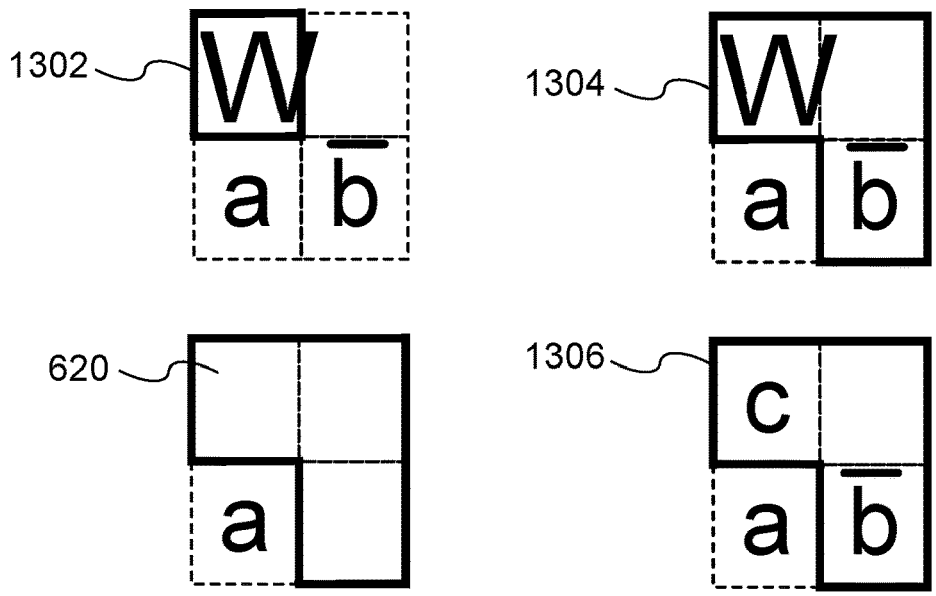

FIGS. 12 and 13 help illustrate an example referred to herein as the "W_ab example". This example focuses on a 2-by-2 set of neighboring cells, which may be part of a larger grid or may be the entire area of a grid. Although a 2-by-2 grid is much smaller than the grid used, e.g., on many laptops, tablets, and workstations, devices such as Internet of Things devices or embedded systems may have displays that have many fewer cells than a typical laptop, tablet, or workstation display. Regardless, teachings illustrated by the 2-by-2 grid may be applied by one of skill to larger grids.

FIG. 12 shows a state change, beginning with a top row "W" and a bottom row "ab". The algorithm 2400 illustrated in FIGS. 12 and 13, which is one of multiple algorithms 2400, includes these steps:

(a) collect 2402 the changed cells (1302 in this example, 602 in general), namely, the cells that will receive new content;
(b) collect 2404 the affected cells (1304 in this example, 604 in general), which are the changed cells plus any cells that an affected cell's glyph overlaps;
(c) clear 2410 the affected cells to be blank (620 denotes cleared cells); and
(d) redraw the affected cells in order by drawing the new content in the changed cells and by redrawing the content of the other affected cells.

In other words, as illustrated in the FIG. 13 this algorithm 2400 does the following:

(a) Collects 2402 the top left cell as the changed cell.
(b) Collects 2404 the top right cell as an affected cell because the W in the top left cell overlaps the top right cell, and collects 2404 the bottom right cell as an affected cell because the underscore in the top right cell overlaps the bottom right cell.
(c) Clears 2410 the top-left, top-right and bottom-right cells to make each blank. In this example, this step clears all the affected cells, not just the original affected cells (i.e., changed cell). A glyph's content 218 may contain transparency, and redrawing on top of another glyph could incorrectly impact how bright parts of the character look.
(d) Redraws the affected cells in an outer-loop-top-to-bottom inner-loop-left-to-right order matching FIG. 15 by drawing the c as new content in the top left cell, then redrawing the underscore in the top right cell, and then redrawing the b in the bottom right cell. The bottom left cell with the a in it is not redrawn because it is not an affected cell.

As an aside, when a glyph is drawn in some embodiments, only the visible part of the glyph is repainted 2412. Otherwise, in this example redrawing the bottom right cell with b after redrawing the top right cell with underscore would paint over the underscore. In other words, a glyph may have graphical content 218 that is implemented as a vector graphic, or content 218 may be implemented as a rectangular of array of pixels. But if content 218 is an array of pixels then all of them except the visible part of the glyph are transparent so when the glyph is redrawn (including being composited) the previously drawn pixels get overlaid with transparent pixels as opposed to non-clear pixels, except for the visible part of the glyph. Even though a glyph texture's background is completely transparent, edges of characters may be partially transparent.

Figures 14, 15:
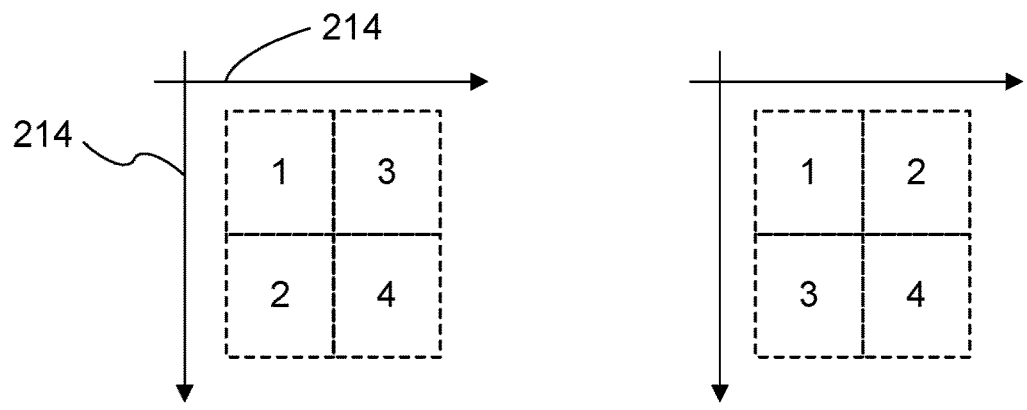

As another aside, although a grid may be traversed in many different orders, it is contemplated that the outer-loop-top-to-bottom inner-loop-left-to-right order matching FIG. 15 will generally be used. This order may also be labeled left-to-right-within-top-to-bottom, and denoted by reference numeral 2510. When this order is used, if a system draws two glyphs and the pixels of each glyph overlap the other, then the display may appear different depending on the order, so a consistent order is desirable in that regard. In the specific case of a terminal 308, a character may be able to overlay another character. For example, an emoji 506 may be assigned to a single cell but be drawn across two cells, namely, the anchor cell 2202 and the cell to its right. If one draws right-to-left then the emoji would completely cover a character to its right, whereas drawing left-to-right results in the character to the right of the emoji being visible because it is drawn after the emoji was drawn.

A 3-by-3 Grid Example

FIG. 16 shows a 3-by-3 grid of cells. This grid contains theoretical characters 520 used here as an example of processing an extreme case of overlapping; every cell's glyph overlaps the cell above, the cell below, the cell to the left, and the cell to the right. This is unlikely to occur in normal usage.

In the initial state, shown in FIG. 16 on the left of the arrow, glyphs in each given cell X that overlap each other cell that is horizontally or vertically adjacent to cell X. For convenience, these cells are referenced here by number. As shown in FIG. 18, in the 3-by-3 grid the cell numbers in this example are assigned in sequence 2508, from top-to-bottom and left-to-right:

1 4 7
2 5 8
3 6 9

A different cell numbering order could also be used to identify cells. Also, instead of giving each cell a single number to identify it, cells could be identified by row and column, e.g., cell-1-1, cell-1-2, and so on. In particular, this cell numbering sequence is not the outer-loop-top-to-bottom inner-loop-left-to-right order:

1 2 3
4 5 6
7 8 9

This difference in the number arrangements illustrates the point that a cell numbering for cell identification does not necessarily match a cell traversal order for redrawing cells.

In this example, glyph rendering includes the following algorithm steps:
(a) Collect changed cells, namely, cells that will get new content.
(b) Collect affected cells, namely, changed cells plus cells that an affected cell overlaps.
(c) Clear the affected cells.
(d) Redraw the affected cells, in order from top-to-bottom row by row, and left-to-right within each row.

In this particular 3-by-3 grid example of the sketch, cell #1 will get new content, namely, an "a". So the algorithm proceeds something like the following.

In a phase denoted here as step (a), collect changed cells, namely, cell #1. This is indicated in the leftmost grid in FIG. 18 using thickened lines to indicate area 1302.

In a phase denoted here as step (b) collect affected cells, namely, changed cells plus cells that an affected cell overlaps. This initially includes cell #1, the changed cell. The original content of cell #1 overlapped cells #4 and #2, so if the test is made whether the original content overlaps, then cells #4 and #2 are affected cells. The new content of cell #1 does not overlap any other cells—the "a" is entirely within cell #1. However, the content of cells #2 and #4 overlap cell #1. Cells #1, #2, #4 are first-level affected cells 606. A test for collecting such cells may include adding a cell X to the affected cells if the cell X glyph overlaps any affected cell, or the test may include adding a cell X to the affected cells if the cell X glyph is overlapped by any affected cell's original content. Either test gives cells #1, #2, #4 as the first-level affected cells. This is indicated in the central grid in FIG. 18 using thickened lines to indicate area 1802.

In this example, a cell x has an affected cell y if: x overlaps y or y overlaps x. Note that this applies to both the new and old content within the cells, so it can be expanded to: old x overlaps y OR new x overlaps y OR old y overlaps x OR new y overlaps x. This could be documented in pseudocode along the following lines:

. . .
function getAffectedCells(c)
    affectedCells=[ ]
    # Add the affected cells of the old glyph if it was changed
    if c.oldGlyph exists
      for each cell a in c.oldGlyph.affectedCells
        affectedCells←a
    # Add the affected cells of the current/new glyph
    for each cell a in c.glyph.affectedCells
      affectedCells←a
. . .

Continuing step (b), cells #3, #5, #7 are collected as second-level affected cells. This is indicated in the rightmost grid in FIG. 18 using thickened lines to indicate area 1804. There are no third-level, fourth-level, etc. affected cells in performance of this algorithm.

In a phase denoted here as step (c), clear the first-level affected cells. FIG. 19 shows a result of clearing the first-level affected cells, #1, #2, #4. The second-level affected cells #3, #5, #7 do not get cleared in performance of this algorithm.

In a phase denoted here as step (d), redraw the affected cells, in order from top-to-bottom by row and left-to-right within each row. The first-level affected cells, #1, #2, #4 are redrawn. Glyphs tied to second-level affected cells #3, #5, #7 are also at least partially redrawn even though those cells themselves are not cleared and redrawn. As shown in FIG. 20, fragments of glyphs assigned to cells #3, #5 and #7 are being drawn in the area belonging to cells #2 and #4. Clipping in this manner helps prevent errors from drawing on top of uncleared cells.

One may notice that in this example second-level affected cells are the set of cells that affect the first-level affected cells, excluding the original changed cells. This example's presentation of multiple levels of affected cells is not generalized to N levels of affected cells. Only two levels are used. This avoids runaway growth of the affected cells. For instance, cells #6, #8 and #9 are not implicated, even though all cells in this 3-by-3 grid example are overlapping with their adjacent cells.

With further attention to the operation of redrawing second-level affected cells in the area clipped to first-level affected cells, the clearing/redrawing in this example includes the following in some implementations:
i) Clear #1, #2 and #4.
ii) Tell a library that's drawing the area to clip the next draw around cells #1, #2, #4. This prevents any change to happen outside of that area
iii) Redraw the content of #1, #4, #7, #2, #5 and #3 in that order. Portions of #4, #7, #2, #5, #3 will be discarded due to the clipping.

W_ab Example Revisited

The glyph rendering algorithm which distinguishes between first-level affected cells and second-level affected cells, applied above to glyph data in a 3-by-3 grid example, may also be applied to the glyph data of the W_ab Example.

As an alternative notation, the grid is described here using text, but one may also refer to the illustrations in FIGS. 12-14.

Assume the grid is numbered thus to identify the cells:
1 3
2 4

The original state of the grid looks something like this:
W_
a b

In this original state, the W overlaps on the right and the _ overlaps on the bottom.

The grid's new state looks something like this:
c_
a b

Applying the algorithm, one has the following:
(a) The changed cell is #1.
(b1) The first-level affected cells are #1 (changed cell), and #3 (overlapped by changed cell). Notice this does not match FIG. 13. In FIG. 13, the glyph rendering method applied made no distinction between first-level and second-level affected cells, but cells #1, #3, and #4 are cleared. But in this current example the algorithm applied does make that distinction.
(b2) The second-level affected cell is #4 (overlapped by first-level affected cell #3).
(c) Clearing the first-level affected cells means clearing #1 and #3. Again, this does not match FIG. 13 because #4 is not cleared here but was cleared in FIG. 13 under the algorithm it illustrates.
(d) Redrawing the affected cells, in order from top-to-bottom and left-to-right means redrawing #1 to contain the "c", then redrawing the portion of #3 that is inside cell #3. This gives the correct result, even though it did not follow the same clearing and redrawing steps as FIG. 13.

Ligatures

FIGS. 22 and 23 illustrate application of the algorithms to a grid having a ligature glyph. The algorithms operate much the same as in the examples already provided, with the additional consideration that the constituent characters in a ligature are linked to form a single glyph content 218. Take for example ">=" (greater than or equals), in which the cell on the left affects the one on the right and cells are deemed affected accordingly. Similarly, a glyph spans three cells such as "!==" is processed by noting, e.g., in a map 222, that two cells are linked to and affected by a third cell. Which cell has the glyph assigned to it depends on where the glyph's anchor point is placed.

Pseudocode Example

A pseudocode 2608 representation of one suitable glyph rendering algorithm 2400 is as follows:

```
function redraw(rows)
  # Add initial changed cells
  changedCells=[ ]
  for each row r in rows
    for each cell c in r
      if c has changed
        changedCells←c
  # Add cells and their affected cells
  redrawCells=[ ]
  for each cell c in changedCells
    addCell(redrawCells, c)
  # Clear cells
  for each cell c in redrawCells
    clear c
  # Draw cells
  ensure redrawCells is sorted top to bottom, left to right
  for each cell c in redrawCells
    draw c
function addCell(redrawCells, c)
  # Add c and recurse through its affected cells
  if redrawCells does not contain c
    redrawCells←c
    for each cell a in getAffectedCells(c)
      addCell(redrawCells, a)
function getAffectedCells(c)
  affectedCells=[ ]
  for each cell a in c.glyph.affectedCells
    affectedCells←a
```

With regard to this pseudocode, it may be noted that c.glyph.affectedCells will include cells that c's glyph affects, as well as cells that affect c. One way to manage this data in an implementation is with a hashmap 222, e.g., a map organized as: 'Map<number, Map<number, [number, number][ ]>>' where the first number is x, the second number is y, and "[number, number][ ]" is an array of x, y values that the cell affects or is affected by. Whenever the values change this hashmap would be updated to reflect the current state.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, with the benefit of teachings provided herein, an embodiment may be used to render 2500 oversize glyphs 216 in a monospace grid 208. Glyph rendering algorithms 2400 collect 2402 changed cells 602, collect 2404 affected cells 604 based on overlap 220, clear 2410 certain affected cells, and redraw 2412 only specified cells. By reducing the number of cells 210 whose glyphs are redrawn in response a text edit or other change in glyph value 402, algorithms described herein permit faster renderer execution 2502 even when rendering is done by a script 2606 rather than pre-compiled code 2604. Algorithmic advances made possible by teachings presented herein also permit faster display 126 frame rates, and help preserve battery 128 power. Grids 208 may be numbered (e.g., per FIGS. 14, 15, 18) in different ways, grids 208 may be traversed 2506 in different ways. Oversize glyphs 216 may include, for example, underscores 514, ligatures 512, mathematical symbols 504, emojis 506, kanji 516, accented characters 518 in various natural languages, and wide or tall text characters 502 which extend beyond the display space 704 of a single cell 210. Glyph rendering may provide user interface updates in browsers 302, shells 304, terminal emulators 308, and other programs 224.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 12, 13, 16-25 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured for rendering oversized glyphs to a monospace grid, the computing system comprising:
   a processor;
   a memory in operable communication with the processor;
   a display in operable communication with the processor, the display configured to display contents of glyphs in a monospace grid having at least two orthogonal axes and having grid cells; and
   a glyph renderer comprising rendering software which upon execution by the processor performs at least the following: (a) collects changed cells, namely, grid cells that upon being redrawn will get visible replacement glyph content; (b) collects affected cells, namely, to changed cells add cells that a changed cell or an affected cell overlaps; (c) clears the contents of changed or affected cells; and (d) redraws the contents of changed or affected cells in a redraw sequence which complies with a predefined grid traversal order, thereby replacing the contents of affected cells with their respective replacement glyph content, while avoiding redrawing visible cells which are not affected cells.

2. The computing system of claim 1, wherein the predefined grid traversal order traverses at least a portion of a row R1 from left to right and then traverses at least a portion of a row R2 from left to right, where R1 is above R2, from a perspective looking at the display.

3. The computing system of claim 1, wherein the glyph content comprises at least one of the following: text characters, mathematical symbols, emojis, emoticons, graphemes, ligatures, underscores, or accented characters.

4. The computing system of claim 1, wherein the glyph renderer resides in, includes, or is in operable communication with, a controller, wherein the redrawn contents of affected cells are displayed within a portion of the display that is controlled at least in part by the controller, and wherein the controller includes a browser or a web application or both.

5. The computing system of claim 1, wherein the glyph renderer resides in, includes, or is in operable communication with, a controller, wherein the redrawn contents of affected cells are displayed within a portion of the display that is controlled at least in part by the controller, and wherein the controller includes at least one of the following: a shell, a terminal emulator, a text editor, an extensible software development tool, or an integrated development environment.

6. The computing system of claim 1, wherein the glyph renderer is invoked by, includes, or is in operable communication with, a script, and wherein the redrawn contents of affected cells are displayed within a portion of the display that is controlled at least in part by execution of the script.

7. The computing system of claim 1, wherein the glyph renderer includes non-kernel code bytes, and less than 20% of the glyph renderer non-kernel code bytes are precompiled native code.

8. The computing system of claim 1, further comprising a map which correlates each cell C of a set of cells with zero or more other cells that C affects or that C is affected by.

9. A method for rendering oversized glyphs to a monospace grid, the method comprising:
collecting changed cells, namely, grid cells that upon being redrawn will get visible replacement glyph content differing from their respective original glyph content;
collecting a non-empty set of first-level affected cells, namely, by adding to changed cells any cells that a changed cell overlaps plus any cells that overlap a changed cell, where overlap is assessed with regard to original glyph content or replacement glyph content or both;
collecting a set of second-level affected cells, if any, namely, each cell that is not a first-level affected cell, and that a first-level affected cell overlaps or that overlaps a first-level affected cell, where overlap is with regard to original glyph content or replacement glyph content or both;
clearing the contents of first-level affected cells;
redrawing the contents of affected cells in a redraw sequence which complies with a predefined grid traversal order, thereby replacing the contents of affected cells with their respective replacement glyph content; and
avoiding redrawing visible cells which are not affected cells.

10. The method of claim 9, wherein the set of collected second-level affected cells is empty, and redrawing only redraws the contents of first-level affected cells.

11. The method of claim 9, wherein the method comprises avoiding redrawing any visible cell which is not an affected cell.

12. The method of claim 9, wherein the method comprises accounting for a ligature.

13. The method of claim 9, wherein the method further comprises mitigating cell escapes by glyphs of a font, by performing at least one of the following:

increasing cell height;
increasing cell width;
clipping redrawing to occur only within first-level affected cells;
clearing only a portion of a cell whose own contents consist of whitespace; or
disallowing drawing between rows of cells.

14. The method of claim 9, wherein the glyph renderer upon execution performs the following listed steps in the listed order and without any of the listed steps being concurrent with any other of the listed steps: (a) collecting changed cells, (b) collecting a non-empty set of first-level affected cells, (c) collecting a set of second-level affected cells, if any, (d) clearing the contents of first-level affected cells, and (e) redrawing the contents of affected cells without redrawing cells which are not affected cells.

15. The method of claim 9, wherein the method comprises avoiding redrawing at least part of a row of visible cells when at least one cell of the row is not a changed cell.

16. The method of claim 9, wherein the method comprises interpreting a script which controls the collecting steps, the clearing step, and the redrawing step.

17. A storage medium configured with code which upon execution by one or more processors performs a method for rendering oversized glyphs to a monospace grid, the method comprising:
collecting changed cells, namely, grid cells that upon being redrawn will get visible replacement glyph content from their respective original glyph content;
collecting a non-empty set of affected cells, namely, changed cells plus cells that a changed cell overlaps plus cells that overlap a changed cell, where overlap is with regard to original glyph content or replacement glyph content or both;
clearing the contents of the affected cells;
redrawing the contents of the affected cells in a redraw sequence which complies with a predefined grid traversal order, thereby replacing the contents of affected cells with their respective replacement glyph content; and
avoiding redrawing an entire row of visible cells by avoiding redrawing at least one cell of the row which is not a changed cell.

18. The storage medium of claim 17, wherein redrawing the contents comprises redrawing at least a portion of at least one of the following: a text character, kanji, hanzi, a mathematical symbol, a grapheme, a ligature, an underscore, or an accented character.

19. The storage medium of claim 17, wherein the method further comprises mitigating cell escapes by glyphs of a font, by performing at least one of the following:
increasing cell height for at least one row of cells;
increasing cell width;
clearing only a portion of a cell whose own contents consist of whitespace; or
disallowing drawing between rows of cells.

20. The storage medium of claim 17, wherein the method comprises avoiding redrawing any visible cell which is not an affected cell.

* * * * *